United States Patent
Parsons et al.

(10) Patent No.: US 11,612,027 B2
(45) Date of Patent: Mar. 21, 2023

(54) SETTABLE MULTI-SPECTRAL FLASHLIGHT

(71) Applicant: Armament Systems and Procedures, Inc., Appleton, WI (US)

(72) Inventors: Kevin Parsons, Appleton, WI (US); Siu Ngai Wang, Kowloon (HK)

(73) Assignee: ARMAMENT SYSTEMS AND PROCEDURES, INC., Appleton, WI (US)

( * ) Notice: Subject to any disclaimer, the term of this patent is extended or adjusted under 35 U.S.C. 154(b) by 0 days.

(21) Appl. No.: 16/443,308

(22) Filed: Jun. 17, 2019

(65) Prior Publication Data

US 2020/0396806 A1    Dec. 17, 2020

(51) Int. Cl.
| | |
|---|---|
| *H05B 45/20* | (2020.01) |
| *F21L 4/02* | (2006.01) |
| *F21V 23/04* | (2006.01) |
| *H02J 7/00* | (2006.01) |
| *F21Y 115/10* | (2016.01) |
| *F21Y 113/17* | (2016.01) |

(52) U.S. Cl.
CPC .............. *H05B 45/20* (2020.01); *F21L 4/027* (2013.01); *F21V 23/0414* (2013.01); *H02J 7/00* (2013.01); *H02J 7/0047* (2013.01); *F21Y 2113/17* (2016.08); *F21Y 2115/10* (2016.08); *H02J 7/0048* (2020.01); *H02J 7/0049* (2020.01)

(58) Field of Classification Search
CPC .............. H05B 33/0863; F21Y 2113/17; F21Y 2115/10
See application file for complete search history.

(56) References Cited

U.S. PATENT DOCUMENTS

| | | | | |
|---|---|---|---|---|
| 8,292,804 | B2 * | 10/2012 | Marka | A61B 90/35 600/249 |
| 2002/0036902 | A1 * | 3/2002 | Lynch | F21L 4/005 362/166 |
| 2010/0226127 | A1 * | 9/2010 | Bigliatti | F21V 5/002 362/235 |

(Continued)

OTHER PUBLICATIONS

"XT DF," Armament Systems and Procedures, Inc.(2 pgs.) Jan. 1, 2015.

*Primary Examiner* — Dedei K Hammond
(74) *Attorney, Agent, or Firm* — Hahn Loeser & Parks LLP

(57) ABSTRACT

A multi-spectral flashlight includes a housing, a battery disposed in the housing, a power switch, a LED module including a plurality of LEDs which emit different colors of illumination, a LED driver coupled to the LED module, and an alternate illumination selector switch coupled to the LED driver. The LED driver is configured to drive the LED module in a default illumination mode in response to a first user operation of the power switch and a selected alternate illumination mode in response to a second user operation of the power switch. The LED driver is further configured with a plurality of selectable pre-determined alternate illumination modes which include different colors of illumination. The LED driver advances through the plurality of selectable pre-determined alternate illumination modes in response to operation of the alternate illumination selector switch, allowing selection of one of the plurality of modes as the selected alternate illumination mode.

20 Claims, 7 Drawing Sheets

(56) References Cited

U.S. PATENT DOCUMENTS

| | | | | |
|---|---|---|---|---|
| 2010/0328935 A1* | 12/2010 | Pance | ................... | G06F 1/3265 |
| | | | | 362/231 |
| 2012/0176780 A1* | 7/2012 | Gross | ................. | F21V 23/0414 |
| | | | | 362/184 |
| 2014/0240967 A1* | 8/2014 | Sharrah | ..................... | F21L 4/08 |
| | | | | 362/183 |
| 2015/0091454 A1* | 4/2015 | McRae | ................. | H05B 45/20 |
| | | | | 315/186 |
| 2016/0249431 A1* | 8/2016 | Yan | ....................... | H05B 33/10 |

* cited by examiner

Fig. 2
Fig. 3
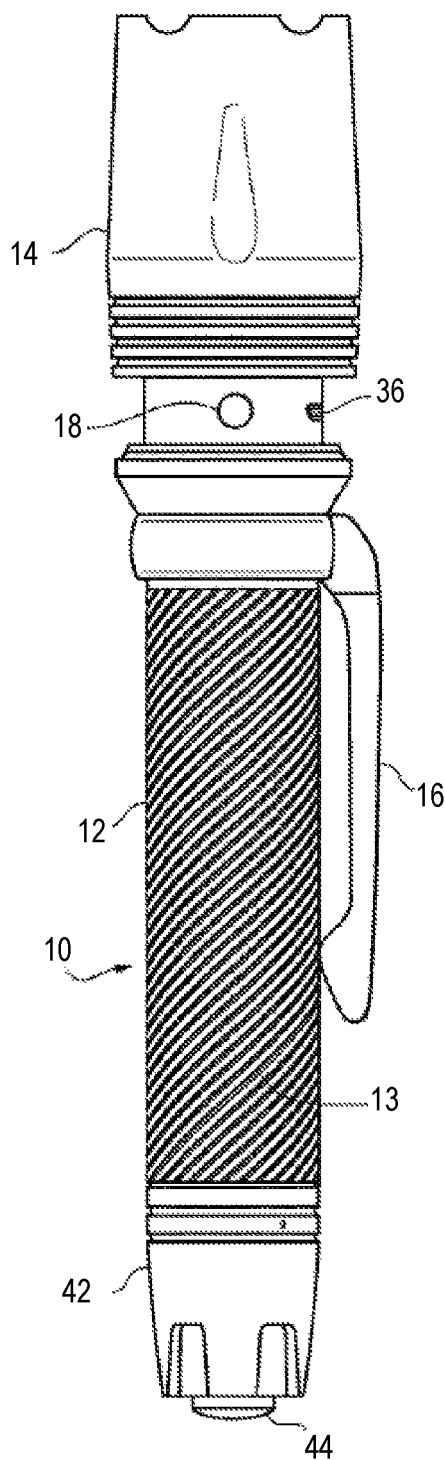
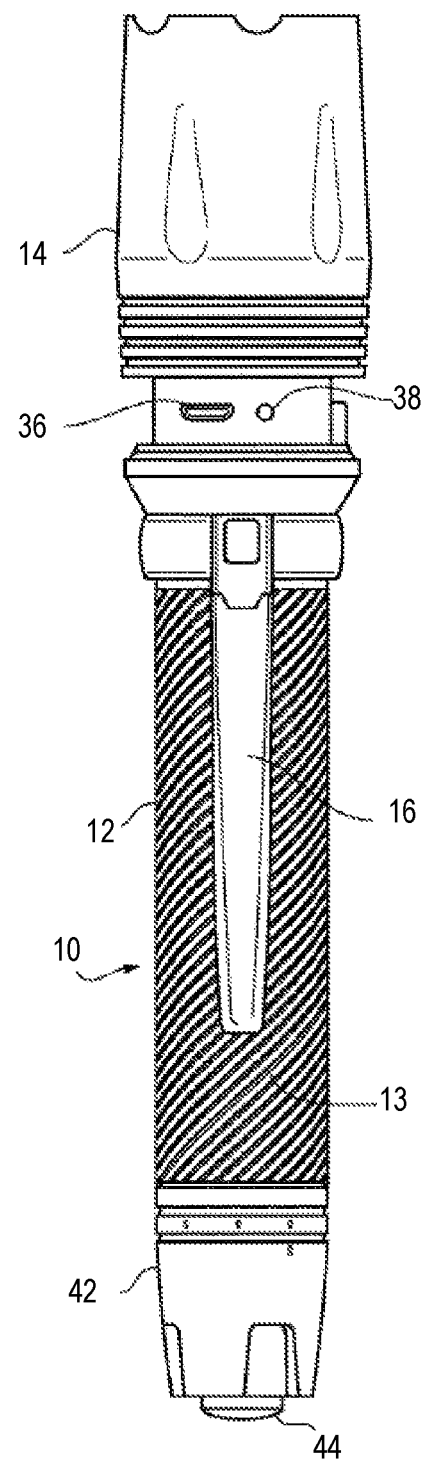

SETTABLE MULTI-SPECTRAL FLASHLIGHT

This application relates to a flashlight with user settable colors, light levels and/or patterns of light that can be emitted.

BACKGROUND

Multi-function flashlights which switch between different levels of illumination and/or illumination modes are known. However, switching between modes, or returning to a default mode, may be cumbersome. For example, a typical known selectable mode flashlight provides a first illumination level when first activated, a second illumination level when activated a second time, a third illumination level when activated a third time, and so on. A disadvantage of this arrangement is that to repeat any given illumination mode, one must cycle through all of the other illumination modes. This also limits the number of modes which could be desirable to include on any given flashlight.

Multi-color flashlights are also known. However, such flashlights often provide selection of a light by rotating a switch or bezel, requiring a two-step activation to provide a selected color.

SUMMARY

A multi-spectral flashlight includes a housing, a battery disposed in the housing, a power switch mechanically coupled to the housing and electrically coupled to the battery, a LED module including a plurality of LEDs which emit different colors of illumination, a LED driver coupled to the LED module, and an alternate illumination selector switch coupled to the LED driver. The LED module is coupled to the battery and to the power switch. The LED driver is configured to drive the LED module in a default illumination mode in response to a first user operation of the power switch and a selected alternate illumination mode in response to a second user operation of the power switch. The LED driver is further configured with a plurality of selectable pre-determined alternate illumination modes. The plurality of selectable pre-determined alternate illumination modes comprise different colors of illumination. The LED driver advances through the plurality of selectable pre-determined alternate illumination modes in response to operation of the alternate illumination selector switch, allowing selection of one of the plurality of modes as the selected alternate illumination mode.

The plurality of LEDs may be disposed in a single package with a common lens. The plurality of LEDs may comprise a white LED, a red LED, a green LED and a blue LED. In some embodiments, the default illumination mode is to illuminate the plurality of LEDs simultaneously and the plurality of selectable pre-determined alternate illumination modes includes illuminating each of the plurality of LEDs individually.

The housing may comprise a cylindrical housing. The LED module and LED driver may be disposed at a first end of the cylindrical housing and the power switch may be disposed at a second end of the cylindrical housing.

The multispectral flashlight may further include a rotatable bezel wherein in a first position of the bezel the alternate illumination select or switch is covered and in a second position of the bezel the alternate illumination selection switch is exposed. In another example, the multispectral flashlight further includes a rotatable cover wherein in a first position of the cover the alternate illumination select or switch is covered and in a second position of the cover the alternate illumination selection switch is exposed.

The first user operation of the power switch may be a single depression of the power switch and the second user operation of the power switch may be a double depression of the power switch in quick succession.

In some embodiments, operation of the alternate illumination selector switch advances the LED driver through the plurality of selectable pre-determined alternate illumination modes only when the power switch is closed.

The multispectral flashlight may further include a battery charging circuit coupled to the battery. The battery charging circuit may include a USB connector and a charge status indicator. In some embodiments, when the USB connector is coupled to a charging source, the charge status indicator provides visual indication of whether the battery is charging or is fully charged, and when the USB connector is not coupled to a charging source, upon the power switch being depressed, the charge status indicator displays one of a plurality of colors indicative of a state of discharge of the battery. The plurality of colors indicative of a state of discharge of the battery may include green, yellow and red.

In a multispectral flashlight having a battery, a power switch, an alternate illumination mode selector switch, a LED module capable of emitting different colors of illumination, and a LED driver, the LED driver being configured to drive the LED module in a default illumination mode and a selected alternate illumination mode, the LED driver further being configured with a plurality of selectable pre-determined alternate illumination modes comprising different colors of illumination, one example of a method of selecting an alternate illumination mode includes the following steps: exposing the alternate illumination selector switch for use; actuating the alternate illumination selector switch to advance the LED driver through the plurality of selectable pre-determined alternate illumination modes; and covering the alternate illumination selector switch when the LED driver advances to a desired alternate illumination mode.

The method may further include the step of actuating the power switch prior to actuating the alternate illumination selector switch.

In some examples, the alternate illumination selector switch cannot be inadvertently actuated by a user when covered. The step of exposing the alternate illumination selector switch may comprise rotating a bezel. The step of exposing the alternate illumination selector switch may comprise rotating a cover.

When the LED module includes a plurality of LEDs which emit different colors of illumination, the step of actuating the alternate illumination selector switch to advance the LED driver through the plurality of selectable pre-determined alternate illumination modes causes the LED driver to activate each of the LEDs of the plurality of LEDs individually. The step of actuating the alternate illumination selector switch to advance the LED driver through the plurality of selectable pre-determined alternate illumination modes may further cause the LED driver to activate all of the plurality of LEDs simultaneously.

BRIEF DESCRIPTION OF THE DRAWINGS

The following drawings illustrate the concepts of the present invention. Illustrations of an exemplary device are not necessarily drawn to scale.

FIG. 2 is a side view of the embodiment of FIG. 1, with the bezel translated longitudinally in a direction away from the housing.

FIG. 3 is a side view of the embodiment of FIG. 1, rotated 90° from the view of FIG. 2 and with the bezel translated longitudinally in a direction away from the housing.

DETAILED DESCRIPTION

Figure 1:
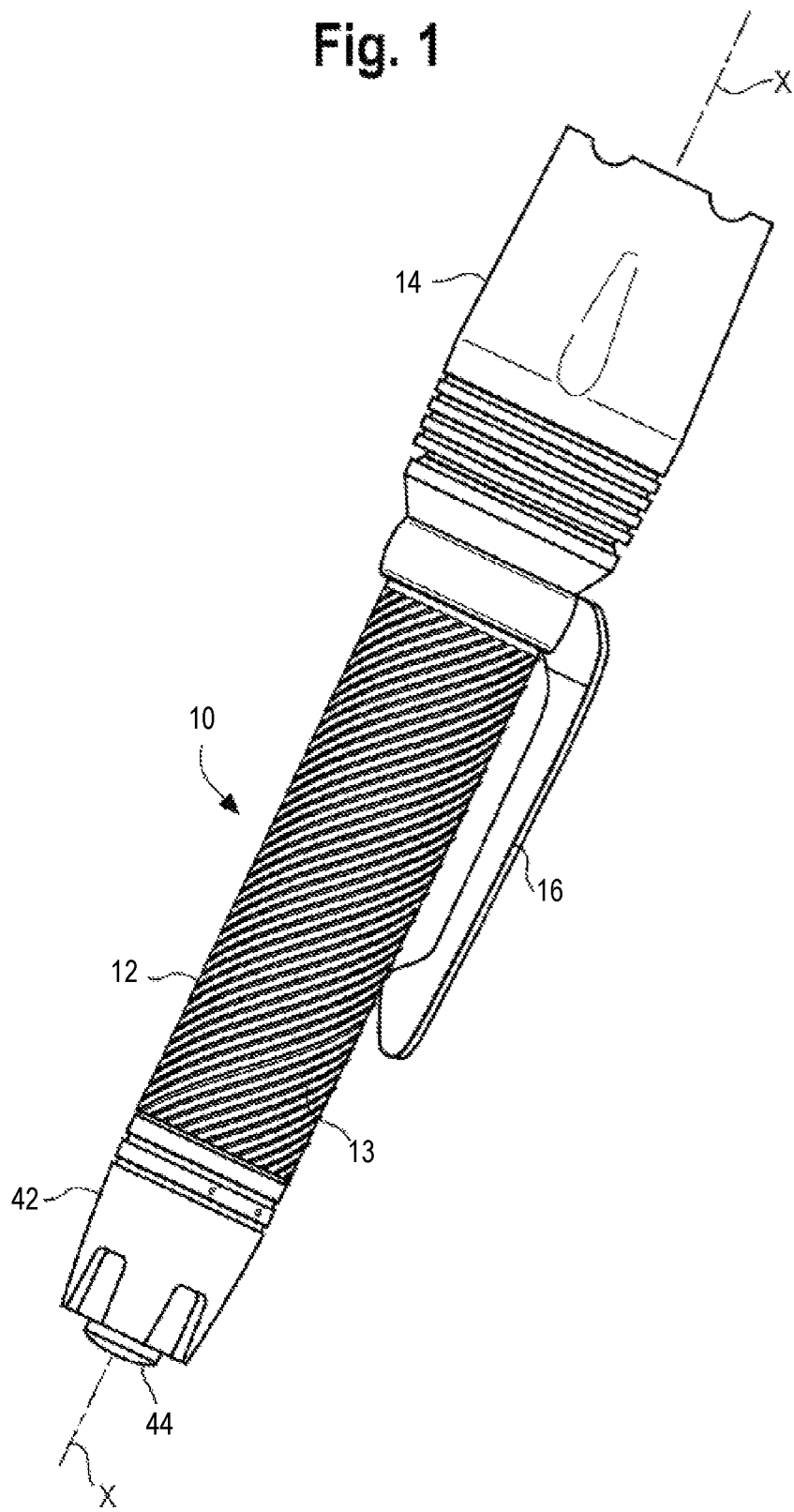
FIG. 1 is a perspective view of an embodiment of a user-settable multispectral flashlight.

While the embodiments described can take many different forms, specific embodiments illustrated in the drawings will be described with the understanding that the present disclosure is to be considered an exemplification of the principles of the invention, and is not intended to limit the invention to a specific embodiment illustrated.

An exemplary multi-spectral flashlight 10 illustrated in FIGS. 1-4 comprises a cylindrical housing 12 having a longitudinal axis "x" and front and rear ends, a bezel 14 adjoining the front end of the housing, and are end cap 42 adjoining the rear end of the housing.

In some embodiments, the housing 12 comprises an outer gripping surface that comprises a spiral groove 13. The spiral groove 13 makes it less likely that the flashlight 10 will slip when being held, but also is less likely than a knurled surface, for example, to abrade a user's clothing.

In some embodiments, the flashlight 10 comprises a clip 16 that is appended to the outer surface of the housing 12 for releasable attachment of the flashlight 10 to a user's person.

Figure 4:
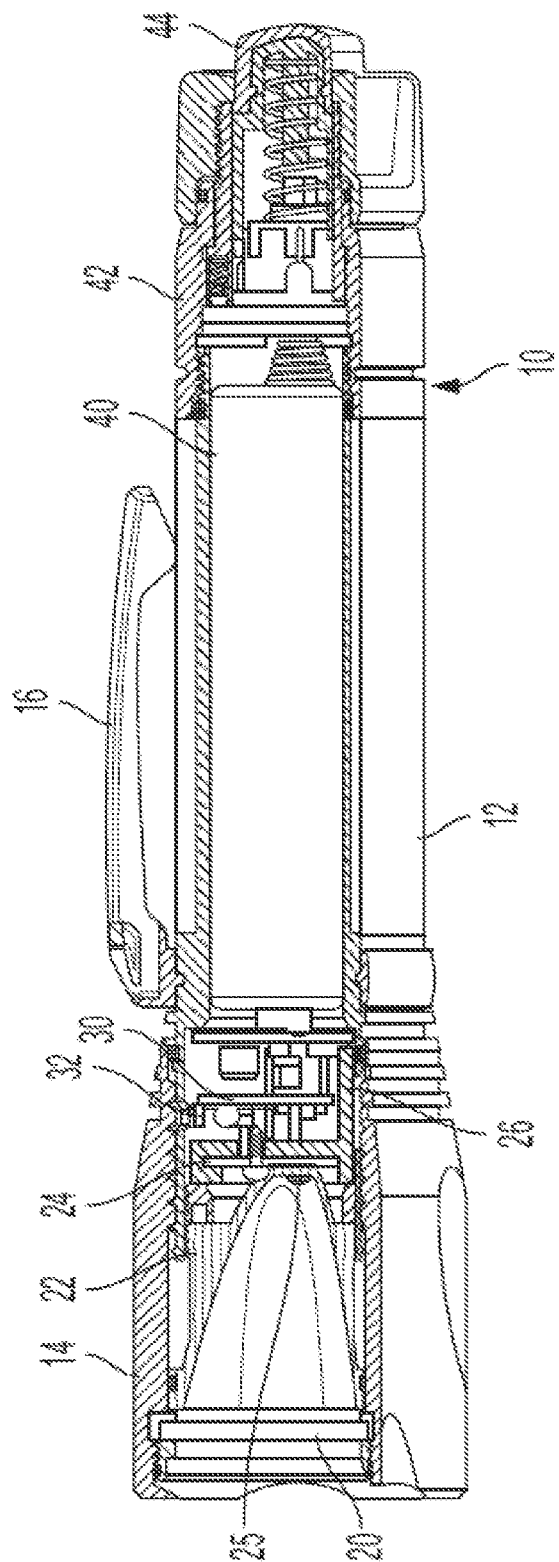
FIG. 4 is a cut away view of the embodiment of FIG. 1.

In one example of the present invention the cylindrical housing 12 comprises a metal alloy body with an elastomeric grip (FIG. 4). In another example, flashlight may comprise a polymer body molded over a metal alloy core. See for example, U.S. Pat. Pub. 2019/0017694, which is incorporated by reference.

Located within the bezel 14 is a lens 20, a reflector 22, and a LED module 24. The reflector may have a parabolic interior shape with an aperture for one or more LEDs on the LED module 24. The LED module comprises a printed circuit board and a multi-spectral LED lamp 25, such as the Cree XM-L multi-color LED. The LED module 24 is mounted on heat sink 26 and is oriented such that the LED lamp is positioned through the aperture and inside a cavity of the reflector 22. The cavity of the reflector 22 is shaped and polished to provide a focused beam when the LED lamp 25 is illuminated. The reflector 22 is formed from thermally conductive material, such as polished aluminum. The LED module 24 is thermally coupled to the cylindrical housing 12, bezel 14, and reflector 22 via heat sink 26.

Figure 5:
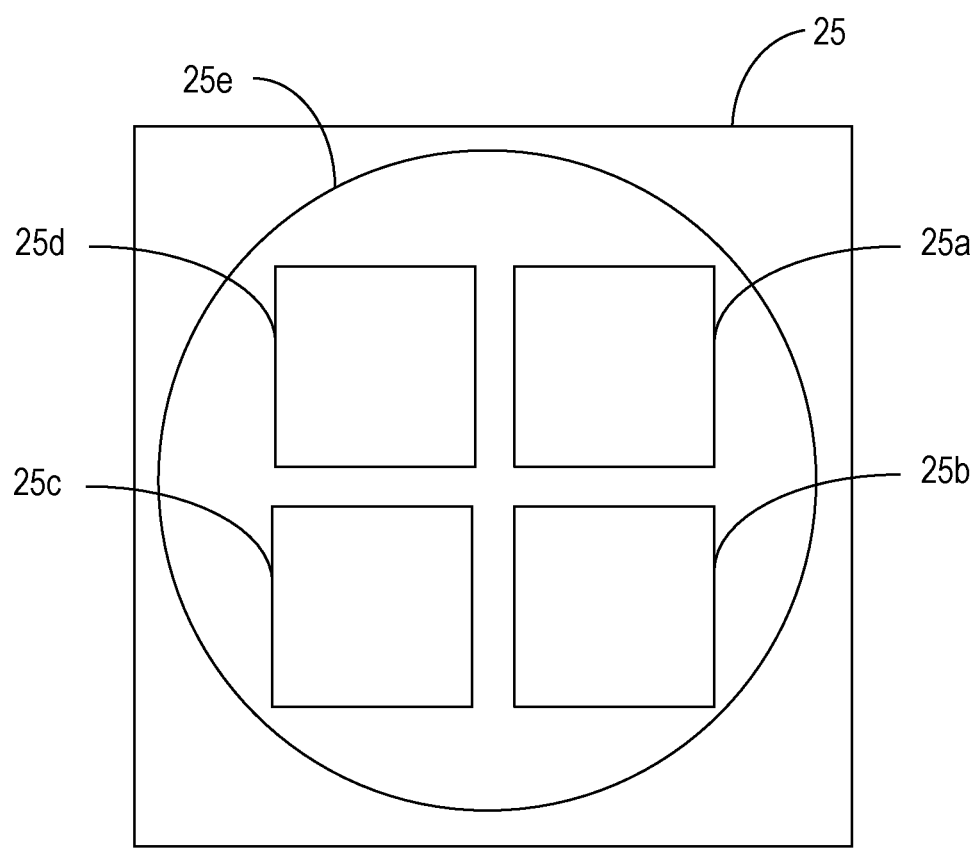
FIG. 5 is a diagram of a multi-spectral LED lamp which may be used in accordance with the present invention.

The LED lamp 25 may comprise a plurality of separately drivable LEDs having different illumination properties. In the example of FIG. 5, LED lamp 25 comprises a white light emitting LED 25a, a red light emitting LED 25b, a blue light emitting LED 25c, and a green light emitting LED 25d on a single substrate with a single lens. Alternatively, individual LEDs may be used. Also, the present invention is not limited to three colors of LED and additional colored LEDs may be added or subtracted as desired. Advantageously, the colored LEDs may be selected such that when their light is combined, white light is produced.

A LED driver 30 is coupled to the LED module 24. The LED driver 30 comprises one or more printed circuit boards having control electronics to supply current to the LED module 24. LED driver 30 may individually provide constant current and voltage to the LEDs 25a-25d. The LED driver may also provide pulse width modulated (PWM) voltage and current to the LEDs 25a-25d to control brightness and/or power dissipation.

Figure 6:
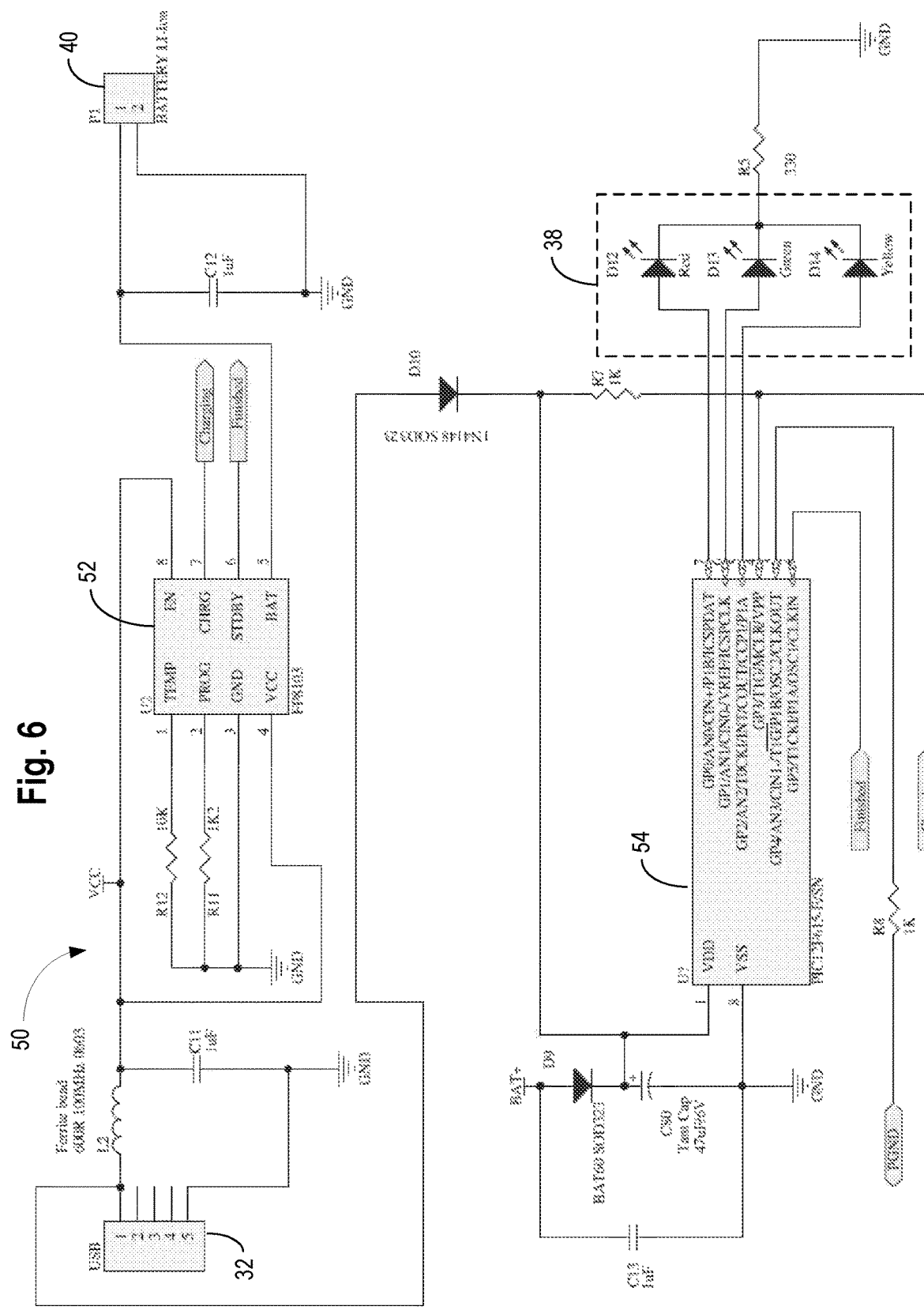
FIG. 6 is an electrical schematic of the charging circuit of the embodiment of FIG. 1.

In the illustrated example, the LED driver 30 also includes a USB port 32 and a battery charging circuit 50 (FIG. 6). The battery charging circuit 50 may be on a separate printed circuit board. In some embodiments, the USB port 32 comprises a micro USB connector and may be accessed through an aperture 36 in the housing 12.

The housing 12 is dimensioned to receive one or more batteries 40. In some embodiments, the battery can be rechargeable, and can be recharged when power is supplied by a charging source through the USB port 32. For example, power can be supplied from a computer or from wall power with appropriate rectification. In some embodiments, the battery 40 may be a rechargeable lithium ion battery, such as a 2200 mAh 18650-type battery. In one example, the battery 40 has both plus and minus electrical terminals at the top of the battery and in electrical contact with the charging circuitry 50, and a minus terminal at the bottom of the battery in electrical contact with a power switch 44 (discussed below). This allows charging of the battery at the top terminals even when the power switch 44 is off. In some embodiments, there is a charging status indicator 38. For example, the charging status indicator 38 can flash red while the battery is charging, and can emit a steady green when the battery is fully charged until the charging source is disconnected from the USB port 32.

Referring to FIG. 6, a charging circuit 50 is provided. USB port 32 is coupled to a charge controller 52 and to a charge status controller 54. Charge controller 52 may comprise a linear charger for lithium-ion batteries. Charge controller 52 is coupled to the battery 40. When a charging source is connected to USB port 32, the charge controller 52 applies a charging current to battery 40 and monitors the battery voltage. During charging, charge controller sets its "CHRG" output to high impedance and pulls down its "STDBY" output. When the battery voltage reaches a predetermined level, the charge controller reduces current output, sets "STDBY" to high impedance and pulls 'CHRG" to down low.

Charge status controller 54 may comprise a programed microcontroller. In the illustrated embodiment, charge status controller 54 is coupled to the "STDBY" and "CHRG" outputs of the charge controller. The charge status controller is programmed to drive the red LED of charge status indicator 38 to flash while the "CHRG" signal is allowed to float high and the "STDBY" signal is driven low, and to steadily illuminate the green LED of charge status indicator 38 when "CHRG" is driven low and 'STDBY" allowed to float high.

In some embodiments, the charge status indicator 38 further provides a visual indication as to the level of battery discharge. In this example, when the USB Port 32 is disconnected from a charging source, both "CHRG" and "STDBY" of the charge controller go into a high impedance state and both red and green status LEDs are extinguished. When the PGND signal is pulled low, such as by depressing power switch 44 either momentarily or constantly, the charge status controller 54 compares the battery voltage to a reference voltage with a built-in comparator. The charge status controller then causes the charge status indictor 38 to illuminate as green, yellow or red to indicate a level of battery discharge. For example, green may indicate that the battery has more than 50% charge remaining, yellow may indicate that the battery has 20%-50% charge remaining, and red may indicate that the battery has less than 20% battery capacity remaining.

Optionally, housing 12 is dimensioned to receive two non-rechargeable CR123A cells in series. In some embodiments housing 12 is dimensioned to receive both battery options to provide flexibility in powering the flashlight. Since the CR123A cells do not have a minus terminal at the top, they are unaffected by the charging circuit 50, but are still electrically connected with the power switch 44.

In the illustrated example, the housing 12 is threaded on the end opposite the LED driver 30, onto which a removable end cap 42 may be attached to the housing 12 by threaded engagement. Removing the end cap 42 provides access to the battery 40, and allows replacement of the battery 40. End cap 42 preferably includes a power switch 44. The power switch 44 may include positions for intermittent activation, persistent activation, and for preventing activation. However, any suitable switch may be used. The power switch 44 is electrically connected to LED driver 30.

In some embodiments, the bezel 14 is rotatable about the longitudinal axis "x". When the bezel 14 is rotated in a first direction, the bezel 14 also moves longitudinally away from the housing 12 along the longitudinal axis "x." When the bezel 14 is rotated in an opposite second direction, the bezel 14 also moves longitudinally toward the housing 12 along the longitudinal axis. As best seen in FIGS. 2 and 3, when the bezel 14 is rotated in the first direction and moves longitudinally away from the housing 12, an alternate illumination mode selection button 18, the universal serial bus (USB) port 32, and the charge status indicator 38 are exposed at the first end of the housing 12.

In some embodiments, the bezel is stationary and a protective cover moves longitudinally when rotated. In some embodiments, the distal end of the bezel 14, the distal end of end cap 42, or both are tapered for easier insertion of the flashlight 10 into a user's pocket.

In some embodiments, the power switch 44 operates by being depressed in a direction of the longitudinal axis "x." In one embodiment, LED driver 30 is configured to cause the LED module 24 to emit a steady bright light if the power switch 44 is single-depressed, and causes the LED module 24 to emit at a desired alternate illumination mode if the power switch 44 is double-depressed in quick succession. Alternatively, the LED driver 30 is configured to cause the LED module 24 to emit the alternate illumination mode in response to a single depression of the power switch 44 and the default illumination in response to a double depression.

In some embodiments, the LED driver 30 is configure to cause the LED module 24 to cycle through a plurality of available alternate illumination modes if the bezel 14 is rotated in the first direction and/or operation of the alternate illumination mode switch 18. This allows a user to select the desired alternate illumination mode from among the plurality of available pre-programmed alternate illumination modes before the bezel 14 is rotated back in the second direction. Examples of available alternate illumination modes include a strobe light and steady lights having different respective levels of brightness, such as 5, 15, 45 and 80 lumens. Other examples of alternate illumination modes include different colors of illumination, such as red, green and blue. Other examples of alternate illumination modes include strobing different colors of light, such as strobing blue light, alternating between white light and blue light, or alternating between red light and blue light, to indicate policy activity. Other examples of alternate illumination modes include mixing illumination colors to produce colors having well-known meanings, such as mixing red light and green light to produce yellow light (or flashing yellow light), which motorists would understand to indicate that caution is required.

Figure 7:
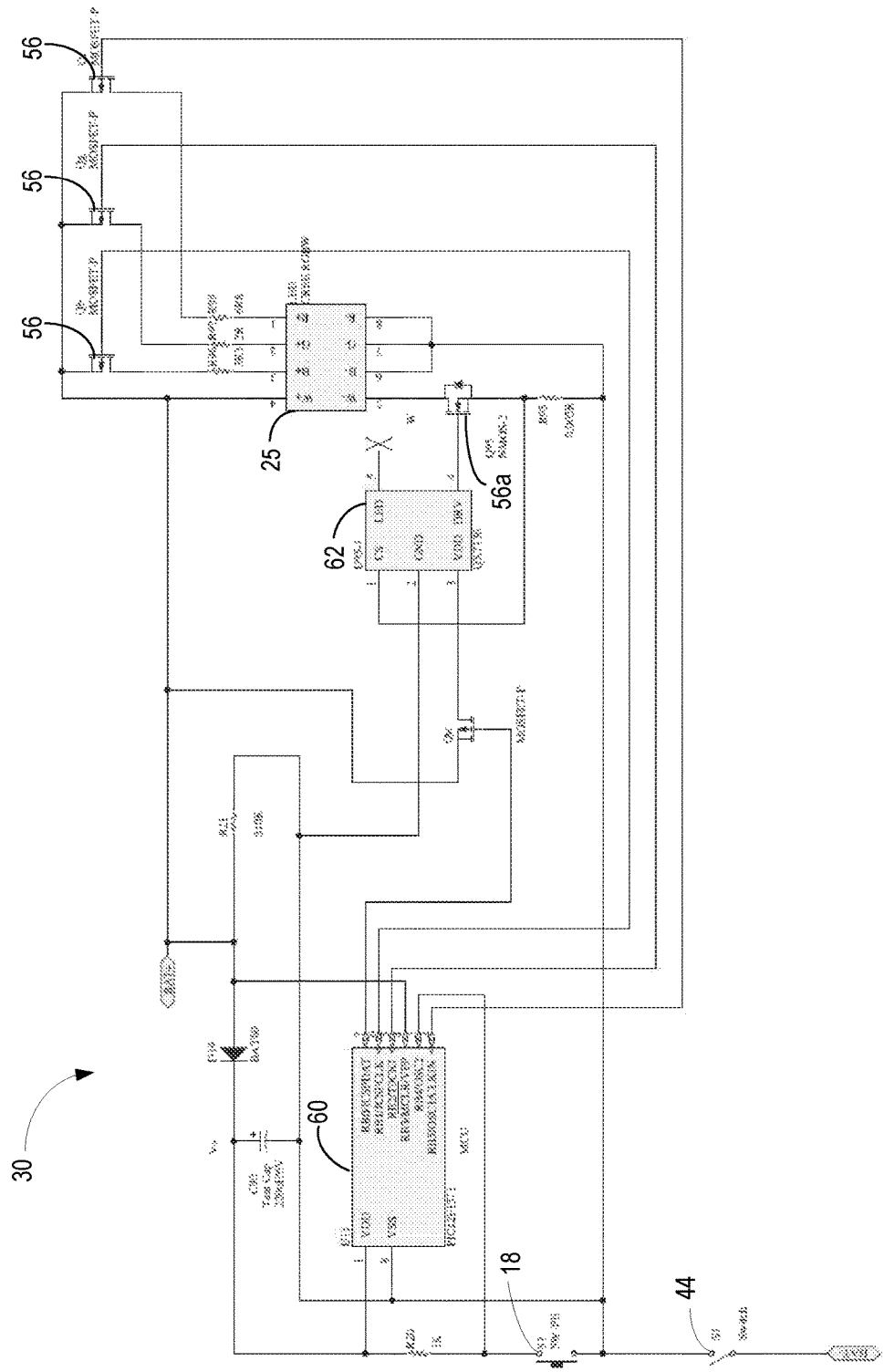
FIG. 7 is an electrical schematic of the LED driver circuit of the embodiment of FIG. 1.
Figure 8:
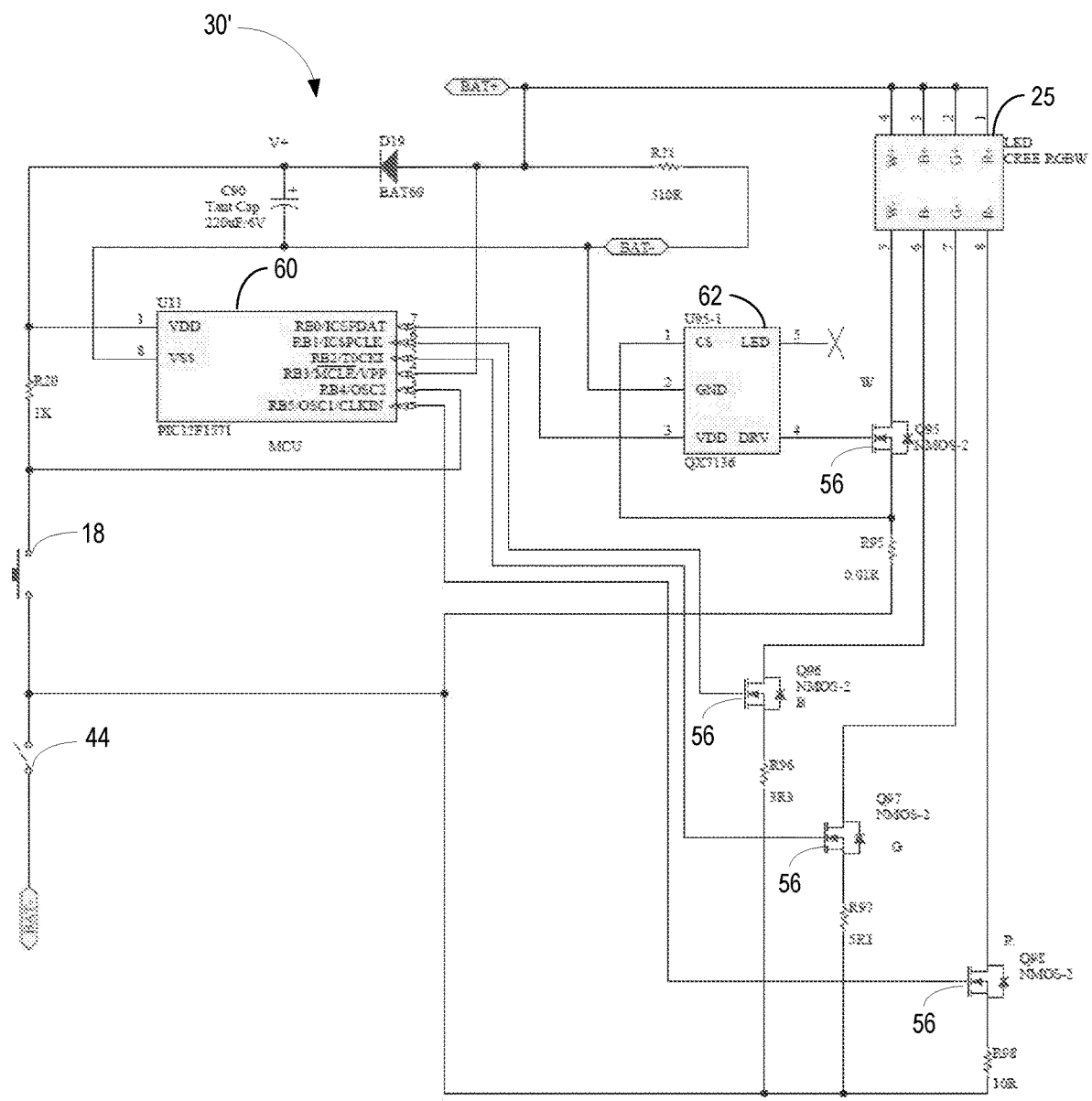
FIG. 8 is an electrical schematic of an alternate LED driver circuit for the embodiment of FIG. 1.

Referring to FIG. 7, an example of schematic of LED driver 30 in combination with power switch 44, alternate illumination mode switch 18, and LED lamp 25 is provided. In this example, LED driver 30 comprises a LED drive controller 60 coupled to a plurality of drive transistors 56. The drive transistors 56 selectively couple the anode sides of the LEDs 25*b*-25*c* to a power circuit coupled to battery positive. A linear current LED driver 62 may be provided to control brightness of illumination, for example, to the white LED 25*a*. In the embodiment of illustrated FIG. 8, the linear current device 62 controls a drive transistor 56*a* coupled between the cathode terminal of LED 25*a* and a ground circuit. This allows setting the LED to a dim (e.g., 15 lumen) illumination. Drive transistors may be coupled to the ground circuit by resistors. The values of the resistors may be selected to obtain a desired amount of current through each LED and, consequently, a desired level of illumination from an LED. In some embodiments, the resistors are selected to obtain equal illumination from the LEDs at high power (e.g., little or no PWM). In another embodiment of a LED driver 30', illustrated in FIG. 8, all of the drive transistors couple the cathode side of LEDs 25*a*-25*d* to a ground circuit.

In some embodiments, the ground circuit is selectively coupled to a negative terminal of the battery the power switch 44. In some embodiments, the anodes of the LEDs are coupled to a positive terminal of the battery 40. The LEDs illuminate when the power switch 44 is closed and their respective drive transistors are turned on.

Alternate illumination mode switch 18 selectively pulls a control input of the LED drive controller low when both it and power switch 44 are closed. The LED drive controller 60 in the illustrated example is a microcontroller which is pre-programmed with a series of illumination modes and/or patterns. Closing both switch 18 and power switch 44 simultaneously advances the LED drive controller 60 to a next illumination mode in the series. Repeating the switch activation advances the LED drive controller through each mode or pattern in the series.

In one example, if the power switch 44 is single depressed, the LED driver 30 activates the LEDs 25*a*-25*d* simultaneously with the output of the red, green, blue and white LEDs combining to provide a bright white light. In some embodiments, this bright white light is the default illumination mode. In some embodiments, alternative illumination mode settings include activating each of the LEDs 25*a*-25*d* individually to provide red, blue or green illumination (LEDs 25*b*-25*d*) and/or lower intensity white illumination or flashing illumination (LED 25*a*). Also, the LEDs 25*a*-25*d* may be illuminated simultaneously with various levels of intensity (e.g., through pulse width modulation) to mix the red, blue and green illumination into any desired color of illumination. The flashlight may be operated in a selected alternative illumination mode with a double depression of the power switch 44.

In some embodiments, the LED driver 30 automatically cycles through the plurality of available alternate illumination modes if the bezel 14 is rotated in the first direction. In some embodiments, the LED driver 30 cycles through the plurality of available alternate illumination modes after further user action if the bezel 14 is also rotated in the first direction. In some embodiments, the LED driver automatically cycles through the plurality of available alternate illumination modes if the bezel 14 is rotated in the first direction and the power switch 44 is maintained in a depressed state. In some embodiments, the LED driver 30 automatically cycles through the plurality of available alternate illumination modes if the bezel 14 is rotated in the first direction and the power switch 44 is depressed and released. In some embodiments, the LED driver 30 causes the desired alternate illumination mode to be selected if the power switch 44 is maintained in a depressed state while the LED driver is cycling through the plurality of available alternate illumination modes, and the power switch 44 is released when the LED module 24 is emitting at the desired alternate illumination mode. In some embodiments, the LED driver 30 causes the desired alternate illumination mode to be selected if the LED module 24 is cycling through the plurality of available alternate illumination modes, and the power switch 44 is depressed and released when the LED module 24 is emitting at the desired alternate illumination mode. In some embodiments, the LED driver 24 causes the desired alternate illumination mode to advance sequentially to a next one of the plurality of available alternate illumination modes each time the alternate illumination mode selection button 18 is depressed and released.

In some embodiments, at least a portion of the end cap 42 is rotatable about the longitudinal axis "x" between three settings. In the first setting, the circuitry causes the LED module 24 to continue to emit the steady bright light or at the desired alternate illumination mode after the power switch 44 is depressed and released, until the power switch 44 is depressed and released a second time. In the second setting, the power switch 44 cannot be depressed far enough for the circuitry to cause the LED module 24 to emit any light. In the third setting, the circuitry causes the LED module 24 to emit the steady bright light or at the desired alternate illumination mode only as long as the power switch 44 is maintained in a depressed state.

From the foregoing, it will be understood that numerous modifications and variations can be effectuated without departing from the true spirit and scope of the novel concepts of the present invention. It is to be understood that no limitation with respect to the specific embodiments illustrated and described is intended or should be inferred.

The invention claimed is:

1. A multi-spectral flashlight, comprising:
   a housing;
   a battery disposed in the housing;
   a power switch mechanically coupled to the housing and electrically coupled to the battery;
   a reflector having an aperture;
   a LED module including a white LED and a plurality of non-white LEDs which emit different non-white illumination, the LED module being disposed within the aperture of the reflector;
   a LED driver coupled to the LED module, the LED module being coupled to the battery and to the power switch, the LED driver being configured to drive the LED module in a default illumination mode in response to a first user operation of the power switch and a selected alternate illumination mode in response to a second user operation of the power switch, the LED driver further being configured with a plurality of pre-determined alternate illumination modes, the selection of a pre-determined alternate illumination mode being user-programable; and
   an alternate illumination selector switch coupled to the LED driver;
   wherein the default illumination mode comprises illuminating the white LED;
   wherein the plurality of selectable pre-determined alternate illumination modes comprises selectively illuminating the different non-white LEDs; and
   wherein the LED driver advances through the plurality of selectable pre-determined alternate illumination modes in response to operation of the alternate illumination selector switch, allowing selection of one of the plurality of modes as the selected alternate illumination mode.

2. The multispectral flashlightof cla wherein the plurality of LEDs are disposed on a single substrate.

3. The multispectral flashlight of claim 1 wherein the plurality of selectable pre-determined alternate illumination modes includes illuminating each of the plurality of non-white LEDs individually.

4. The multispectral flashlight of claim 1, wherein the plurality of non-white LEDs comprises a red LED, a green LED and a blue LED.

5. The multispectral flashlight of claim 1, wherein the plurality of non-white LEDs comprises a red LED, a green LED and a blue LED, wherein the default illumination mode is to illuminate the white LED and all of the plurality of non-white LEDs simultaneously and wherein the plurality of selectable pre-determined alternate illumination modes includes illuminating each of he white LED and the plurality of non-white LEDs individually.

6. The multispectral flashlight of claim 1, wherein the housing comprises a cylindrical housing, and wherein the LED module and LED driver are disposed at a first end of the cylindrical housing and the power switch is disposed at a second end of the cylindrical housing.

7. The multispectral flashlight of claim 6, further comprising a rotatable bezel wherein in a first position of the bezel the alternate illumination select or switch is covered and in a second position of the bezel the alternate illumination selection switch is exposed.

8. The multispectral flashlight of claim 6, further comprising a rotatable cover wherein in a first position of the cover the alternate illumination select or switch is covered and in a second position of the cover the alternate illumination selection switch is exposed.

9. The multispectral flashlight of claim 1, wherein the first user operation of the power switch comprises a single depression of the power switch and wherein the second user operation of the power switch comprises a double depression of the power switch in quick succession.

10. The multispectral flashlight of claim 1, wherein operation of the alternate illumination selector switch advances the LED driver through the plurality of selectable pre-determined alternate illumination modes only when the power switch is closed.

11. The multispectral flashlight of claim 1, further comprising a battery charging circuit coupled to the battery, the battery charging circuit comprising:
    a USB connector; and
    a charge status indicator.

12. The multispectral flashlight of claim 11, wherein when the USB connector is coupled to a charging source, the charge status indicator provides visual indication of whether the battery is charging or is fully charged, and when the USB connector is not coupled to a charging source, upon the power switch being depressed, the charge status indicator displays one of a plurality of colors indicative of a state of discharge of the battery.

13. The multispectral flashlight of claim 12, wherein the plurality of colors indicative of a state of discharge of the battery includes green, yellow and red.

14. The multispectral flashlight of claim 1, wherein the reflector is shaped and polished to provide a focused beam of light.

15. In a multispectral flashlight having a battery, a power switch, an alternate illumination mode selector switch, a reflector having an aperture, a LED module having a white LED and a plurality of non-white LEDs disposed within the aperture of the reflector, and a LED driver, the LED driver being configured to drive the LED module in a default illumination mode and a selectable alternate illumination mode, the LED driver further being configured with a plurality of pre-determined alternate illumination modes selectable by user programing and comprising different non-white colors of illumination, a method of selecting a default illumination mode and an alternate illumination mode comprising:

exposing the alternate illumination selector switch for use;
  actuating the alternate illumination selector switch to advance the LED driver through the plurality of selectable pre-determined alternate illumination modes;
  covering the alternate illumination selector switch when the LED driver advances to a desired alternate illumination mode to program the selection of the alternate illumination mode;
  driving the LED module in a default illumination mode comprising illuminating the white LED in response to a first operation of the power switch; and
  driving the LED module in the desired alternate illumination mode in response to a second operation of the power switch; and
  wherein the plurality of selectable pre-determined alternate illumination modes comprises selectively illuminating the different non-white LEDs.

16. The method of claim 15, further comprising the step of actuating the power switch prior to actuating the alternate illumination selector switch.

17. The method of claim 15, wherein the alternate illumination selector switch cannot be inadvertently actuated by a user when covered.

18. The method of claim 15, wherein the step of exposing the alternate illumination selector switch further comprises rotating a bezel.

19. The method of claim 15, wherein the step of exposing the alternate illumination selector switch further comprises rotating a cover.

20. The method of claim 15, wherein the step of actuating the alternate illumination selector switch to advance the LED driver through the plurality of selectable pre-determined alternate illumination modes causes the LED driver to activate each of the white LED and the plurality of non-white LEDs individually.

* * * * *